March 29, 1955 E. WEIL 2,704,961
MEANS FOR SUPPORTING SPECTACLES
Original Filed Oct. 4, 1950 2 Sheets-Sheet 2
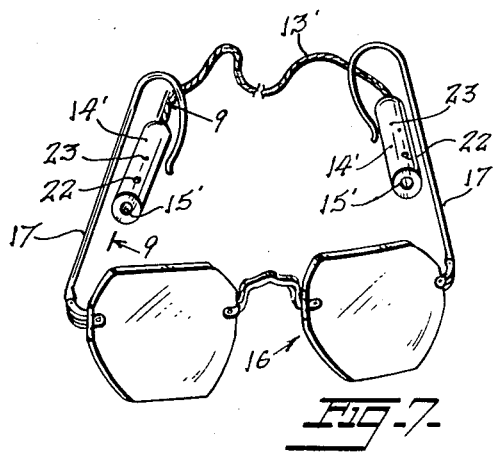
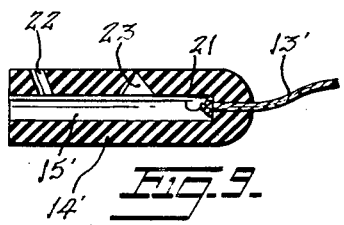
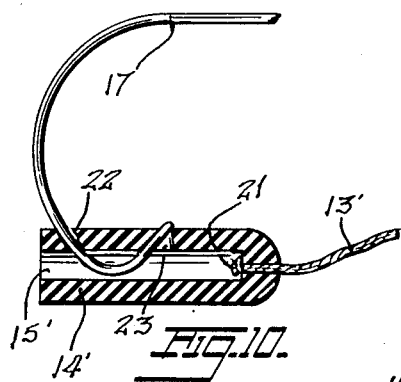
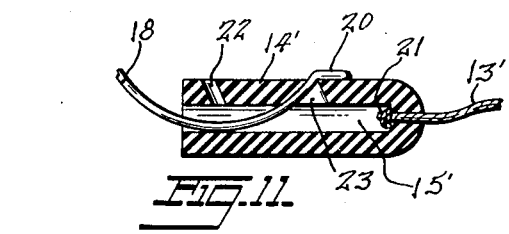
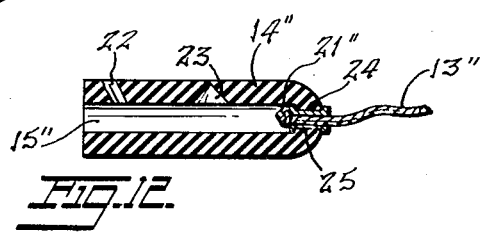
INVENTOR.
EDWARD WEIL
BY
ATTORNEY

United States Patent Office 2,704,961
Patented Mar. 29, 1955

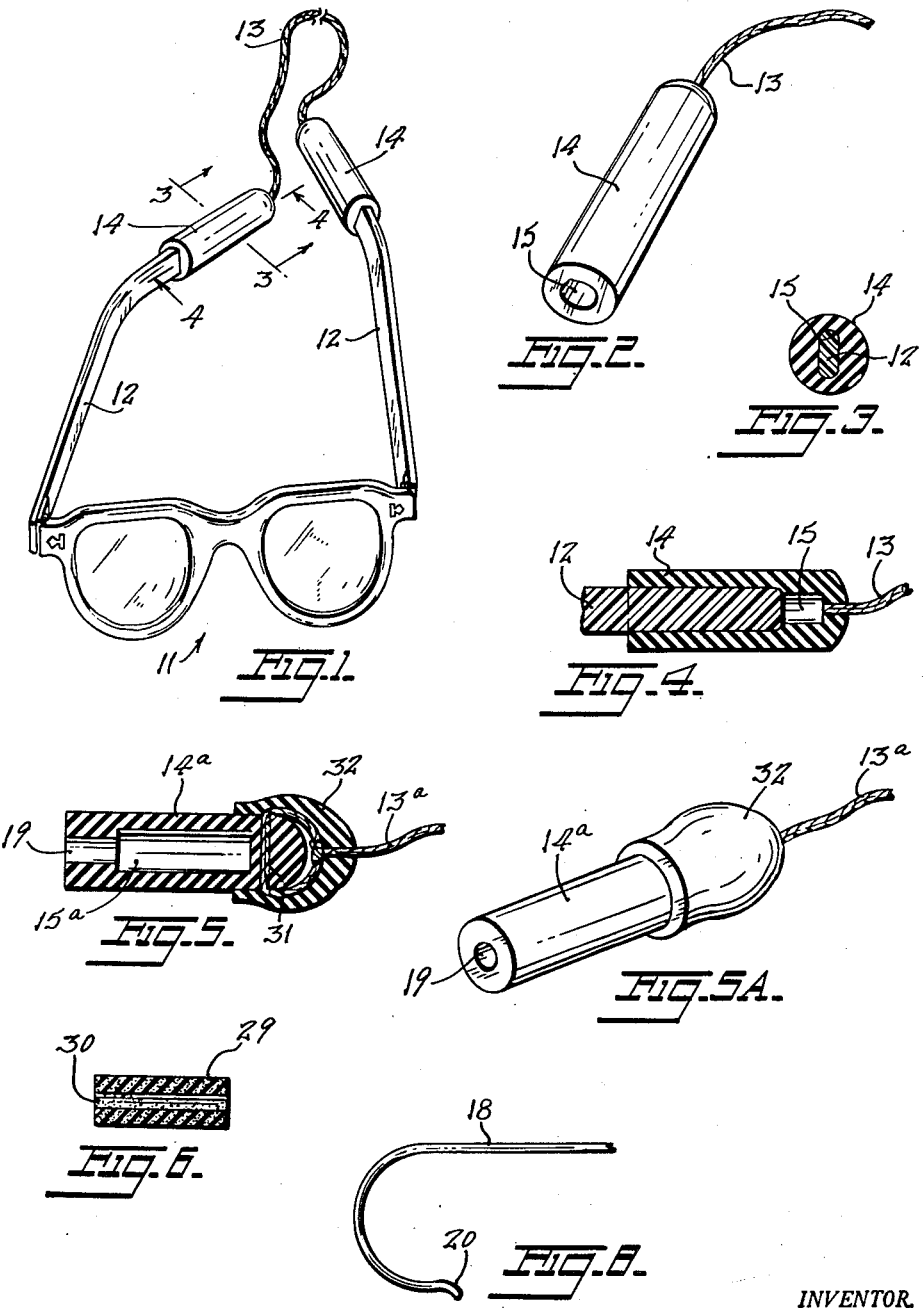

2,704,961

MEANS FOR SUPPORTING SPECTACLES

Edward Weil, Leonia, N. J.

Substituted for abandoned application Serial No. 189,079, October 4, 1950. This application June 16, 1954, Serial No. 437,069

2 Claims. (Cl. 88—51)

This invention relates to new and useful improvements in spectacles and, more particularly, to improved means for supporting spectacles on the user's person when the same are not actually in use. This is a substitute for my former application filed on October 4, 1950, Serial No. 189,079.

One object of the present invention is the provision of simple and effective means for frictionally engaging and interconnecting the ends of spectacle temples whereby said spectacles can be supported on the user's neck after the fashion of a necklace when the same are not in use.

A modified form of the invention has for its object the provision of unique frictional gripping means adapted to be utilized with a variety of types and sizes of temples.

A further object of the invention is to construct the means thereof in such manner that the same is capable of being manufactured economically.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a pair of spectacles having plastic temples interconnected by the means of the invention.

Fig. 2 is an enlarged perspective view of one of the temple gripping means.

Fig. 3 is an enlarged sectional view on line 3—3 of Fig. 1.

Fig. 4 is an enlarged sectional view on line 4—4 of Fig. 1.

Fig. 5 is a center sectional view similar to Fig. 4 but illustrates a modified construction.

Fig. 5A is a perspective view of the means of Fig. 5.

Fig. 6 is a center sectional view of an attachment for the means of Fig. 5.

Fig. 7 is a perspective view of a pair of spectacles having wire temples, with modified means for engaging said temples also being shown.

Fig. 8 is a fragmentary side elevation of another form of wire temple.

Fig. 9 is an enlarged sectional view on line 9—9 of Fig. 7.

Fig. 10 is a sectional view similar to Fig. 9 but illustrates the engagement of the temple of Fig. 7 with the modified means.

Fig. 11 is a sectional view similar to Fig. 10 but illustrates the engagement of the temple of Fig. 8 with the modified means.

Fig. 12 is a sectional view similar to Fig. 9 but illustrates a modification in structure.

Referring now to Figs. 1–4 wherein a first form of the invention is illustrated the reference numeral 11 indicates a pair of spectacles having plastic or bone temples 12. According to the invention the turned down ends of the temples 12 are to be interconnected to permit of the spectacles being worn about the neck after the fashion of a necklace when the same are not actually in use. To this end there is provided a suitable cord or ribbon 13 having either end molded into the end of a gripper member 14. Each gripper member 14 is a molded tube of rubber or like material having one end of its bore 15 open to receive the end of one of the temples 12.

The bore 15 preferably has slightly smaller cross section area than the temple 12 so that the latter will fit tightly therein. Further, the bore 15 is made long enough to receive a sufficient length of the temple 12 to ensure enough frictional engagement to prevent accidental disengagement of said temple therefrom.

In Fig. 7 there is illustrated a pair of spectacles 16 having wire temples 17 whose ends are curved to fit around the wearer's ears. In Fig. 8 there is illustrated a wire temple 18 which is curved like the temple 17 but whose end is reverse curved as indicated at 20. These two types of temples, along with the above described temples 12, are the most generally utilized kinds, and it is desired that the means of the invention be applicable to all of them. To this, this above described means are modified as illustrated in Figs. 5, 5A, 6, 7, 9, 10 and 11 and wherein like parts are given the same reference numerals as hereinbefore with a suitable differentiating mark such as the letter A or a prime added.

The modified means of Figs. 5, 5A and 6 comprises a length of cord 13ᵃ having either end passed through a radial hole 31 in the closed end of a tube 14ᵃ and knotted without the said closed end. The hole 31 and the knotted end of cord 13ᵃ are covered and protected by a bulb-like cap 32 frictionally fitted over the closed end of the tube 14ᵃ. The tube 14ᵃ differs from the tube 14 described above in that the bore 15ᵃ thereof is wider and is provided with a portion 19 of reduced cross section at the open end thereof. In obvious manner the wall of portion 19 firmly grips a thick temple piece 12 and secures the same in place.

In order that wire temples such as those indicated at 17 and 18 in Figs. 7 and 8 can be secured to tube 14ᵃ, the sponge rubber liner 29 of Fig. 6 is adapted to be engaged in the wide portion of bore 15ᵃ behind the narrowed opening 19 thereof. The liner 29 may be provided with a bore 30 adapted to wire frames of any thickness.

The modified means of Figs. 7, 9, 10 and 11 comprises a suitable cord 13' having its ends secured to gripper members 14' each provided with a bore 15'. The cord 13' may be secured to each gripper member 14' the same as described above or in the manner shown in Figs. 9, 10 and 11, wherein each end thereof is provided with a knot 21 located in the end of the associated bore 15', the cord passing out of the member 14' through a small opening in the end thereof which is heat-sealed after the formation of the knot.

Adjacent the open end of each tube 14' the wall thereof is provided with a hole 22 which as it extends inward to bore 15' is inclined toward the closed end of the latter. Between the hole 22 and the closed end of tube 14' and in line with the former a second hole 23 is provided, said hole having practically zero diameter externally of the tube but as it extends inward widening at an angle substantially equal to the angle of incline of the hole 22.

The construction is such that tube 14 is engaged over a bulky temple 12 the same as described above. However, by means of the holes 22 and 23 the same is also engageable by the temples 17 and 18. Preferably the curve of temple 18 is extended into bore 15' through the open end thereof, and out of the bore through hole 23 with the reversely curved end 20 thereof engaged against the periphery of the tube. The hole 23, it will be seen, tightly grips the temple 18 and the same is securely fastened to the tube 14'. Preferably, the temple 17 is engaged with tube 14' by passing the curved end thereof inward through the hole 22 and outward again through the hole 23, the curve thereof being sharpened somewhat in said operation. Thus it will be seen securely fastens the temple and the tube together.

A further modification of the invention is illustrated in Fig. 12 wherein like parts are given the same reference numerals as hereinabove with a double prime added. As shown the bore 15" of tube 14" is not closed at one end but rather is provided with an end portion 24 of reduced cross sectional area. A metal eyelet 25 is engaged in the reduced portion 24 and has the cord 13" passing therethrough to a knot 21" located in the bore 15" with this construction the end 13" can readily be replaced.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. Means for connecting together the rear ends of the wire temple pieces of a pair of spectacles so that the spectacles can be depended from the wearer's neck when not in use, comprising an elongated cord, elongated tubes mounted by one of their ends on the ends of said cord to have their ends remote from said cord open; and a longitudinally spaced pair of holes formed in one side of each of said tubes and communicating with the interiors of said tubes so that the end of each of said temple bars can be inserted through said holes of one of said tubes, the hole of each of said pairs of holes remote from the ends of said tubes attached to said cord being angled inward toward the said attached ends of said tubes and the other hole of each pair being increased in diameter from their outer ends to a maximum diameter at the inner ends of those said other holes where they communicate with said bore.

2. For use in conjunction with spectacles having a pair of wire temples the ends of which are curved to fit around the ears of the wearer, a device for engaging the said curved ends whereby the spectacles can be suspended about the wearer's neck, comprising a pair of elongated tubes each joined at one end to the other by a length of cord, each tube including a pair of longitudinally spaced holes through the wall thereof and in communication with the interiors of the tubes and so arranged whereby the curved end of each temple may be passed first through one of said holes of a pair and then through the second hole thereof, the hole in each of said tubes remote from the end of the tube joined to the cord being angled inwardly toward the end of the tube joined to the cord, and the second of said holes in each tube being of a small diameter at the peripheral surface of the tube and increasing gradually to a greater diameter where the hole communicates with the interior of the tube.

References Cited in the file of this patent

UNITED STATES PATENTS

| | | |
|---|---|---|
| 1,819,738 | Daniels | Aug. 18, 1931 |
| 2,249,572 | Lieber | July 15, 1941 |
| 2,481,946 | Pendleton | Sept. 13, 1949 |
| 2,499,140 | Griffith, Jr. | Feb. 28, 1950 |